Oct. 6, 1964 F. D. MORGAN ETAL 3,151,814
DISPOSAL DEVICE FOR GLASS ARTICLES
Filed Dec. 15, 1961 2 Sheets-Sheet 1
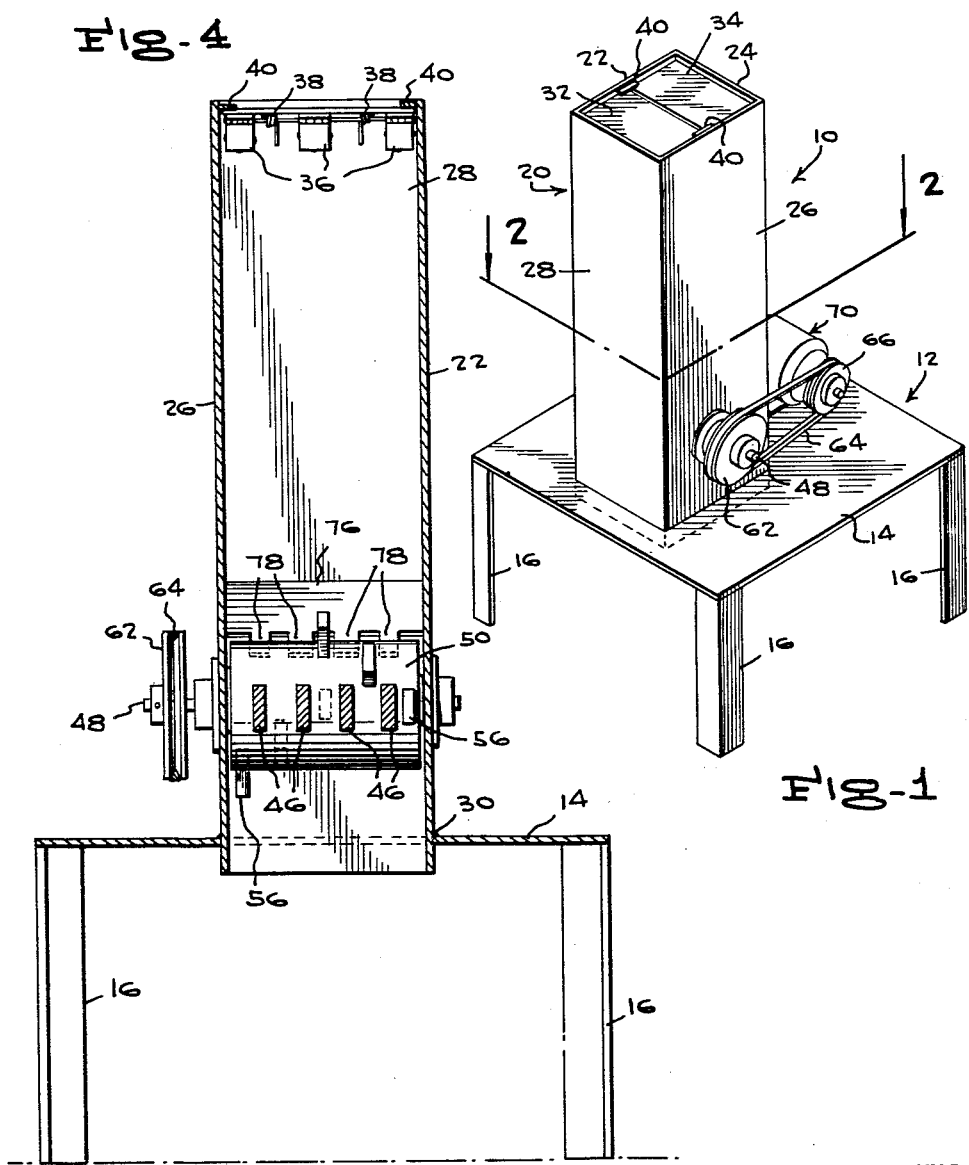
INVENTORS
FURMAN D. MORGAN, &
JAMES R. WOODS
BY
McMorrow, Berman + Davidson
ATTORNEYS

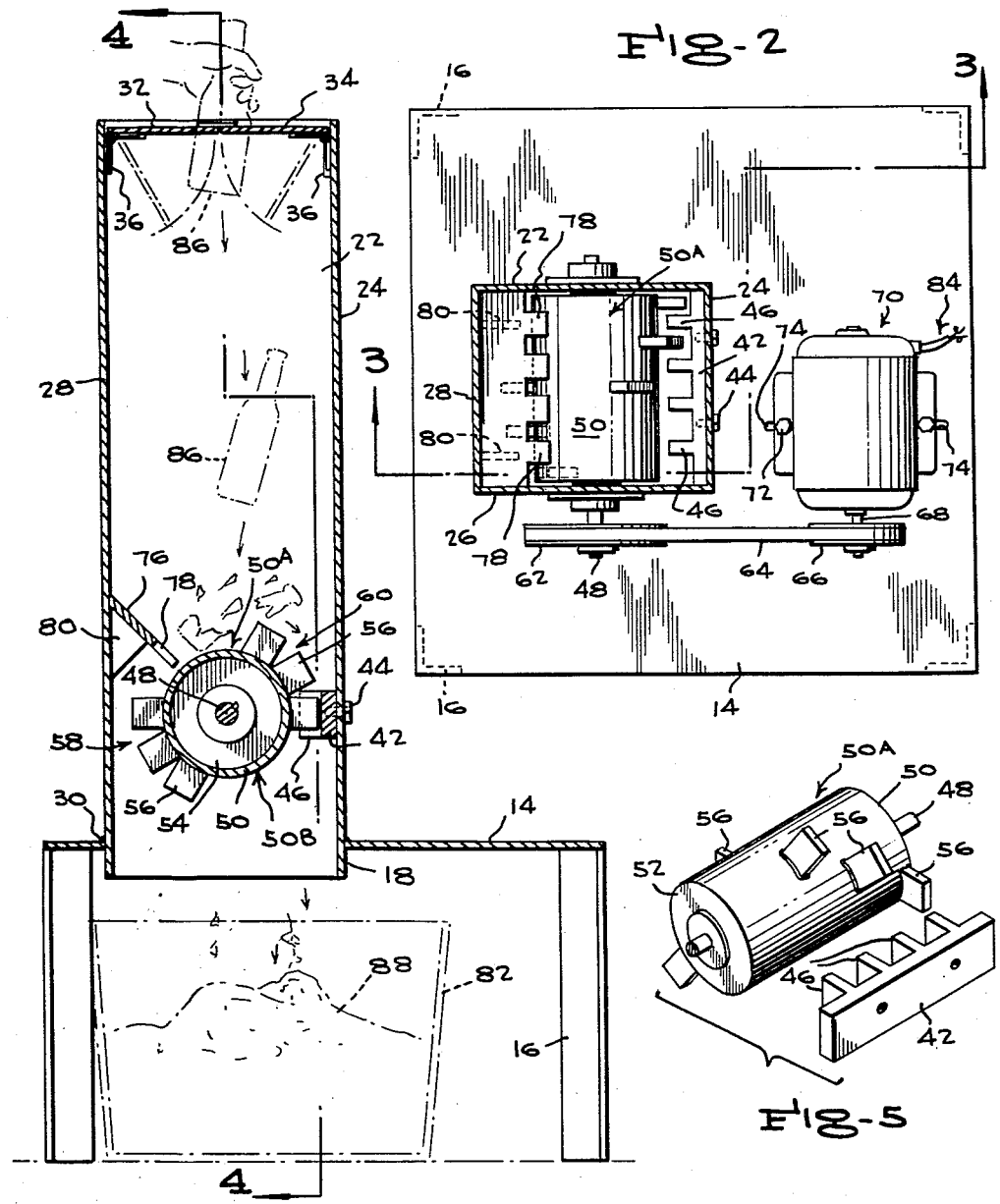

United States Patent Office 3,151,814
Patented Oct. 6, 1964

3,151,814
DISPOSAL DEVICE FOR GLASS ARTICLES
Furman D. Morgan and James R. Woods, both of P.O. Box 75, West Yellowstone, Mont.
Filed Dec. 15, 1961, Ser. No. 159,710
5 Claims. (Cl. 241—99)

This invention pertains to disposal means for glass articles, such as, for example, glass bottles, tumblers, medical bottles, electric light bulbs, et cetera.

It is a well-known fact that the Federal Laws prohibit the refilling and reuse of liquor and other types of bottles, including bottles having original poisonous contents, and bottles which were initially used to contain medical preparations, and/or glass bottles which were originally filled with substances which could be considered as being deleterious to health when used by an innocent third party.

One of the primary causes of illnesses and occasionally death resides in the fact that third persons will retrieve and refill abandoned or discarded bottles with liquid or solid preparations adapted to be utilized for immediate personal needs and without prior knowledge of the original contents of the bottle, and without effecting the complete sterilization thereof. This inherent danger is completely obviated by the instant invention which has, as the fundamental object thereof, the provision of a device or mechanism forming an accouterment of a dwelling or other establishment, the device or mechanism being especially designed to break and destroy articles formed of glass, and in particular, the instant invention is directed to the provision of a device or mechanism for breaking or shattering glass bottles.

Another object of this invention is to provide a glass-crushing or smashing and shattering device which may be safely operated without fear of physical injury to the user together with means for safely removing and ultimately disposing of the crushed glass particles in any conventional "dump" utilized for the reception of refuse and debris.

A further object of this invention is to provide a glass-crushing or shattering mechanism of the type which eliminates possible physical injury to the operator as the resultant of poisonous gases, dust or glass fragments generated as the result of the crushing operation, and in particular, the mechanism is especially designed to prevent physical injury to the operator as a consequence of uncontrolled fine glass particles.

A still further object of this invention is to provide a glass bottle-crushing or shattering machine which will occupy but a minimum of space and which does not require connection with a source of water or other liquids to allay glass dust.

It is a further object of this invention to provide a glass-crushing machine together with tray means to receive the shattered or crushed glass whereby the removal of this debris is facilitated.

This invention also contemplates, as a further object thereof, the provision of a glass-crushing or smashing machine which is inexpensive to manufacture and maintain, non-complex in construction and assembly, and which is durable in use.

Other and further objects and advantages of the instant invention will become more manifest from a consideration of the following specification when read in conjunction with the annexed drawings, in which:

FIGURE 1 is a perspective view of a disposal device or mechanism for glass articles constructed in accordance with this invention;

FIGURE 2 is an enlarged detail cross-sectional view, FIGURE 2 being taken substantially on the horizontal plane of line 2—2 of FIGURE 1, looking in the direction of the arrows;

FIGURE 3 is a vertical cross-sectional view, FIGURE 3 being taken substantially on the line 3—3 of FIGURE 2, looking in the direction of the arrows;

FIGURE 4 is a vertical cross-sectional view, FIGURE 4 being taken on the line 4—4 of FIGURE 3, looking in the direction of the arrows; and FIGURE 5 is an exploded perspective view illustrating the glass-crushing or shredding elements.

Referring now more specifically to the drawings, reference numeral 10 designates, in general, a glass-disposal device or machine constructed in accordance with the teachings of this invention. As illustrated, the machine 10 includes a support structure 12 having an elongated substantially rectangular platform 14 supported in elevated position on angle iron legs 16 which depend, respectively, from each corner of the platform 14.

The platform 14 is formed with a substantially rectangular opening 18 adjacent one end thereof through which is inserted a vertically-elongated substantially hollow rectangular casing 20. The casing 20 comprises vertically-elongated rectangular side walls 22, 24, 26, 28, the lower ends of which protrude through and below the platform 14 and are welded or otherwise secured thereto, as at 30.

Reference numerals 32, 34 denote a pair of identically constructed substantially rectangular closure panels disposed adjacent the upper end of the casing 20 and each extends across substantially one-half the transverse cross-sectional area of the casing 20. The panels are hingedly connected at 36 to a pair of oppositely-disposed side walls 24, 28. The adjacent free sides of the panels 32, 34 are constantly biased for upward movement by tension springs 38, this movement being limited by stops or abutments 40 secured in confronting relation to the inner sides of the side walls 22, 26 and which overlap the free sides of the panels 32, 34 adjacent their respective ends. The panels 32, 34 in their normally closed positions, as shown in FIGURES 1 and 3, are horizontal and and coplanar.

To the side wall 24, adjacent the lower end thereof, and above the plane of the platform 14, is secured a stationary bar 42 having a rectangular configuration. The bar 42 may be fastened by screws 4 or by other conventional means and includes a plurality of laterally-projecting, longitudinally-spaced teeth 46.

Supported for rotation on the side walls 22, 26 and extending therebetween adjacent the lower ends thereof, is a shaft 48 which carries a cylinder 50 having opposed closed ends 52, 54, and the cylinder 50 is keyed to the shaft for rotation therewith. The cylinder 50 is integral with a plurality of radially-extending teeth 56 axially spaced from one another and circumferentially staggered relative to each other. As is seen in FIGURES 2, 3 and 4, the teeth 56 are arranged in two groups 58, 60 comprising three teeth each, with the groups being located, respectively, adjacent one of the ends of the cylinder 50, the teeth 56 being adapted to pass between the teeth 46 as the cylinder 50 is rotated. The relationship between the two groups of teeth provides intermittent areas 50A, 50B in which none of the teeth 56 is present in order to serve a function to be described.

The drive shaft 48 extends laterally from the side wall 26 and has rigidly secured thereto or mounted thereon a pulley 62. The pulley 62 is driven through an endless belt 64 that is trained thereabout and also around a pulley 66 carried on the drive shaft 68 of an electric motor 70. The latter is mounted on the platform 14 and is adjustably secured thereon by motor-mounting bolts 72 engageable within slots 74 in order to effect tension on the belt 64.

Depending from the inner side of the side wall 28, and at an acute angle relative thereto, is a deflector plate 76 having substantially a rectangular configuration and being downwardly inclined toward the cylinder 50. The plate 76 is provided at its lower free side with a plurality of longitudinally-spaced teeth 78 between which pass the teeth 56 as the cylinder 50 rotates. It will be understood that the cylinder 50 rotates, as viewed in FIGURE 3, in a clockwise direction.

It is preferable to reinforce the deflector plate 76 by means of one or more gusset plates 80 that are longitudinally spaced relative to the deflector plate 76 and are secured thereto and to the side wall 28 by conventional means.

The spacing between each adjacent pair of legs 16 provides sufficient clearance to pass a receptacle 82 therebetween, the latter being shown in dotted lines in FIGURE 3, whereby the receptacle 82 may be positioned immediately below the open lower or discharge end of the casing 20.

The wire conductors designated generally at 84 are adapted to be connected with a source of conventional E.M.F., in order to energize the motor 70 whenever the disposal 10 is to be activated.

In use, a glass bottle, container, bulb or other similar article denoted at 86, shown in dotted lines in FIGURE 3, is thrust through the panels 32, 34, forcing the same to pivot downwardly and away from each other in the manner shown in dotted lines in FIGURE 3. The bottle 86 is then released to fall directly on the cylinder 50 or on the deflector plate 76 which will then, in turn, pass the bottle to the cylinder. As soon as the bottle 86 passes the panels 32, 34 the same will close or return to their normal horizontal positions under the tension of the springs 38 to protect the user against glass dust, splinters, and other debris resulting from the actuation of the machine 10.

As the bottle 86 engages the cylinder 50 it normally rests on one or the other of the two areas 50A, 50B for subsequent impaction by the teeth 56 whereby the bottle is shattered and the fragments thereof are carried clockwise, as viewed in FIGURE 3, toward the fixed teeth 46 at which point the teeth 56 and the teeth 46 cooperate to shred the glass for passage through the open lower end of the casing 20 (see FIGURE 3) for deposit as debris 88 in the receptacle 82.

It has been found advantageous to provide the clear areas 50A, 50B on the cylinder 50 so that the full impaction force of the teeth 56 may be immediately delivered to the glass bottle 86, for should the cylinder be fully occupied by crushing teeth 56 the bottle 86 would have a tendency to ride on or be supported on such blades without immediately breaking or shattering.

Having described and illustrated in detail one embodiment of this invention, it is to be understood that the same is offered merely by way of example, and that this invention is to be limited only by the scope of the appended claims.

What is claimed is:

1. A disposal machine for breaking and shattering a glass container or other glass articles, said machine comprising a normally horizontal substantially rectangular platform having support legs depending from the corners thereof, said platform having an opening extending transversely therethrough adjacent an end thereof, a normally upright casing having a pair of opposed open upper and lower ends, said casing having its lower end protruding through said opening and rigidly connected to said platform, a horizontally-elongated bar fixedly secured to said casing and disposed interiorly thereof, a plurality of longitudinally-spaced teeth projecting laterally from said bar, a shaft extending transversely of said casing and rotatably supported thereon, said shaft having an end extending exteriorly of said casing, a cylinder mounted on said shaft and disposed in said casing, said cylinder having a plurality of axially-spaced teeth projecting laterally therefrom and adapted to pass between said first teeth, a pulley fixedly connected to said extending end of said shaft, a motor mounted on said platform and having a drive shaft, a pulley mounted on said drive shaft, and a pulley belt trained around both of said pulleys.

2. A disposal machine as defined in claim 1, and a deflector plate disposed within said casing adjacent said cylinder, said deflector plate being downwardly inclined toward said cylinder.

3. A disposal machine as defined in claim 2, wherein said deflector plate is provided with a plurality of longitudinally-spaced teeth to permit said teeth on said cylinder to pass therebetween.

4. A disposal machine as defined in claim 3, wherein said teeth on said cylinder are disposed in two groups with said teeth of each group being axially spaced and staggered relative to each other, each group being disposed adjacent one of the respective ends of said cylinder, and with each group being circumferentially spaced from one another to provide intermediate areas on said cylinder devoid of said teeth.

5. A disposal machine as defined in claim 4, and a pair of closure panels fixedly connected to said casing adjacent the upper end thereof, and resilient means constantly biasing said panels for movement toward their closed positions.

References Cited in the file of this patent

UNITED STATES PATENTS

| | | |
|---|---|---|
| 2,558,255 | Johnson | June 26, 1951 |
| 2,620,988 | Tellier | Dec. 9, 1952 |
| 2,853,247 | Anderson | Sept. 23, 1958 |
| 2,869,793 | Montgomery | Jan. 20, 1959 |